United States Patent
MacLennan et al.

(10) Patent No.: US 6,310,443 B1
(45) Date of Patent: Oct. 30, 2001

(54) JACKETED LAMP BULB ENVELOPE

(75) Inventors: Donald A. MacLennan, Gaithersburg; Brian P. Turner, Damascus; Aleksandr Gitsevich, Gaithersburg; Gary K. Bass, Mt. Airy; James T. Dolan, Frederick; Kent Kipling, Gaithersburg, all of MD (US); Douglas A. Kirkpatrick, Great Falls, VA (US); Yongzhang Leng, Damascus; Izrail Levin, Silver Spring, both of MD (US); Robert J. Roy, Frederick; Bruce Shanks, Gaithersburg, both of MD (US); Malcolm Smith, Alexandria, VA (US); William C. Trimble, Columbia; Peter Tsai, Olney, both of MD (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/616,995

(22) Filed: Jul. 14, 2000

Related U.S. Application Data (62) Division of application No. 09/228,230, filed on Jan. 11, 1999, now Pat. No. 6,137,237.
(60) Provisional application No. 60/109,591, filed on Nov. 23, 1998, provisional application No. 60/102,968, filed on Oct. 2, 1998, provisional application No. 60/099,288, filed on Sep. 4, 1998, provisional application No. 60/091,920, filed on Jul. 7, 1998, provisional application No. 60/083,093, filed on Apr. 28, 1998, provisional application No. 60/071,285, filed on Jan. 13, 1998, provisional application No. 60/071,284, filed on Jan. 13, 1998, and provisional application No. 60/071,192, filed on Jan. 13, 1998.

(51) Int. Cl.[7] .................................................. H05B 41/16
(52) U.S. Cl. .......................... 315/248; 313/493; 313/113; 313/116
(58) Field of Search ..................................... 313/110, 113, 313/116, 114, 493, 635; 362/222, 223, 363, 365; 315/248, 39

(56) References Cited

U.S. PATENT DOCUMENTS

Re. 21,150    7/1939   Lepel .................................. 176/122

(List continued on next page.)

FOREIGN PATENT DOCUMENTS 38 42 756    6/1990   (DE) .

(List continued on next page.)

OTHER PUBLICATIONS

Godyak, V.A., et al., "Electrical and light characteristics of RF-inductive fluorescent lamps", *J. of the Illuminating Engineering Society*, p 40–44(Winter 1994), presented at the 1993 IESNA Annual Conference.

(List continued on next page.)

*Primary Examiner*—Haissa Philogene
(74) *Attorney, Agent, or Firm*—Paul E. Steiner (57) ABSTRACT

A jacketed lamp bulb envelope includes a ceramic cup having an open end and a partially closed end, the partially closed end defining an aperture, a lamp bulb positioned inside the ceramic cup abutting the aperture, and a reflective ceramic material at least partially covering a portion of the bulb not abutting the aperture. The reflective ceramic material may substantially fill an interior volume of the ceramic cup not occupied by the bulb. The ceramic cup may include a structural feature for aiding in alignment of the jacketed lamp bulb envelope in a lamp. The ceramic cup may include an external flange about a periphery thereof. One example of a jacketed lamp bulb envelope includes a ceramic cup having an open end and a closed end, a ceramic washer covering the open end of the ceramic cup, the washer defining an aperture therethrough, a lamp bulb positioned inside the ceramic cup abutting the aperture, and a reflective ceramic material filling an interior volume of the ceramic cup not occupied by the bulb. A method of packing a jacketed lamp bulb envelope of the type comprising a ceramic cup with a lamp bulb disposed therein includes the steps of filling the ceramic cup with a flowable slurry of reflective material, and applying centrifugal force to the cup to pack the reflective material therein.

12 Claims, 11 Drawing Sheets

U.S. PATENT DOCUMENTS

| | | | |
|---|---|---|---|
| Re. 32,527 | 10/1987 | Shinkawa et al. | 331/99 |
| 843,534 | 2/1907 | Hewitt . | |
| 2,333,052 | 10/1943 | Smith | 176/122 |
| 3,860,854 | 1/1975 | Hollister | 315/248 |
| 3,943,404 | 3/1976 | McNeil et al. | 315/39 |
| 4,007,392 | 2/1977 | Velfells et al. | 313/154 |
| 4,010,400 | 3/1977 | Hollister | 315/248 |
| 4,016,507 | 4/1977 | Havens | 331/96 |
| 4,021,727 | 5/1977 | Fellows | 324/20 R |
| 4,070,603 | 1/1978 | Regan et al. | 315/248 |
| 4,127,797 | 11/1978 | Perper | 315/209 R |
| 4,206,387 | 6/1980 | Kramer et al. | 315/248 |
| 4,245,178 | 1/1981 | Justice | 315/248 |
| 4,380,744 | 4/1983 | Kantorowicz | 331/107 R |
| 4,427,920 | 1/1984 | Proud et al. | 315/248 |
| 4,484,156 | 11/1984 | Khanna et al. | 331/60 |
| 4,547,750 | 10/1985 | Torizuka et al. | 331/99 |
| 4,613,796 | 9/1986 | Bay | 315/219 |
| 4,705,987 | 11/1987 | Johnston | 313/634 |
| 4,736,454 | 4/1988 | Hirsch | 455/129 |
| 4,775,845 | 10/1988 | McCoy | 331/96 |
| 4,783,615 | 11/1988 | Dakin | 315/248 |
| 4,812,702 | 3/1989 | Anderson | 313/153 |
| 4,864,194 | 9/1989 | Kobayashi et al. | 315/248 |
| 4,894,590 | 1/1990 | Witting | 315/248 |
| 4,894,591 | 1/1990 | Witting | 315/248 |
| 4,906,946 | 3/1990 | Mekata et al. | 331/99 |
| 4,908,492 | 3/1990 | Okamoto et al. | 219/121.52 |
| 4,922,210 | 5/1990 | Flachenecker et al. | 331/167 |
| 4,926,791 | 5/1990 | Hirose et al. | 118/723 |
| 4,949,053 | 8/1990 | Havens | 331/96 |
| 4,982,168 | 1/1991 | Sigmon et al. | 331/107 SL |
| 5,039,081 | 8/1991 | Farrall | 313/160 |
| 5,070,277 | 12/1991 | Lapatovich | 315/248 |
| 5,072,157 | 12/1991 | Greb et al. | 315/248 |
| 5,084,801 | 1/1992 | El-Hamamsy et al. | 315/248 |
| 5,107,229 | 4/1992 | Cheesman | 331/185 |
| 5,118,997 | 6/1992 | El-Hamamsy | 315/248 |
| 5,159,346 | 10/1992 | Bosch et al. | 342/175 |
| 5,214,357 | 5/1993 | Dakin et al. | 315/248 |
| 5,259,436 | 11/1993 | Yun et al. | 164/97 |
| 5,289,139 | 2/1994 | Fiedziuszko et al. | 331/56 |
| 5,339,047 | 8/1994 | Mizan et al. | 330/286 |
| 5,367,226 | 11/1994 | Ukegawa et al. | 315/248 |
| 5,387,850 | 2/1995 | Bray et al. | 315/248 |
| 5,397,966 | 3/1995 | Vrionis et al. | 315/248 |
| 5,404,076 | 4/1995 | Dolan et al. | 313/572 |
| 5,448,137 | 9/1995 | Bobel | 315/244 |
| 5,483,011 | 1/1996 | Lohninger | 331/107 SL |
| 5,498,928 | 3/1996 | Lapatovich et al. | 315/39 |
| 5,498,937 | 3/1996 | Körber et al. | 315/248 |
| 5,500,574 | 3/1996 | Popov et al. | 315/248 |
| 5,541,482 | 7/1996 | Siao | 315/248 |
| 5,570,502 | 11/1996 | Sawtell et al. | 29/527.6 |
| 5,587,629 | 12/1996 | Gornstein | 3615/200 R |
| 5,616,421 | 4/1997 | Sawtell et al. | 428/614 |
| 5,621,266 | 4/1997 | Popov et al. | 313/46 |
| 5,637,961 | 6/1997 | Ishii et al. | 315/111.51 |
| 5,661,365 | 8/1997 | Turner | 313/637 |
| 5,682,080 | 10/1997 | Dolan et al. | 313/570 |
| 5,834,895 | 11/1998 | Dolan et al. | 315/248 |
| 5,834,904 | 11/1998 | Waymouth | 315/248 |
| 5,841,243 | 11/1998 | Hooper | 315/248 |
| 5,841,244 | 11/1998 | Hooper | 315/248 |
| 5,852,339 | 12/1998 | Hamilton et al. | 313/11 |
| 5,886,478 | 5/1999 | Smith et al. | 315/248 |
| 5,886,479 | 5/1999 | Kennedy et al. | 315/248 |
| 5,903,091 | * 5/1999 | MacLennan et al. | 313/161 |
| 5,923,116 | * 7/1999 | Mercer et al. | 313/113 |
| 5,949,180 | * 9/1999 | Walker | 313/113 |
| 5,962,986 | 10/1999 | Morse | 315/248 |
| 5,990,632 | 11/1999 | Smith et al. | 315/248 |
| 6,017,221 | 1/2000 | Flamm | 437/225 |
| B1 1,854,912 | 4/1932 | Spaeth . | |

FOREIGN PATENT DOCUMENTS

| | | |
|---|---|---|
| 030927 | 3/1989 | (EP) . |
| 0357453 | 3/1990 | (EP) . |
| 0457242 | 11/1991 | (EP) . |
| 0458546 | 11/1991 | (EP) . |
| 2170668 | 8/1986 | (GB) . |
| 8-148127 | 6/1996 | (JP) . |
| 93/21655 | 10/1993 | (WO) . |
| 97/45858 | 12/1997 | (WO) . |

OTHER PUBLICATIONS

Piejak, R.B. et al., "A simple analysis of an inductive RF discharge", *Plasma Sources Sci. Technol.* 1:179–186 (1992).

Thomson, J.J., "On the discharge of electricity through exhausted tubes without electrodes", *Phil. Mag.* S.5., vol. 32, No. 32, No. 197, pp. 321–464 (Oct. 1891), The London, Edinburgh, and Dublin Philosophical Magazine and Journal of Science.

Wharmby, D., "Review of electrodeless dicharges for lighting", Thorn Lighting Limited Presentation (Sep. 5, 1989).

Wharmby, D., "Electrodeless discharges for lighting", GE Lighting Europe Presentation (1994).

Wharmby, D.O., Ph.D., "Electrodeless lamps for lighting: A review", IEEE Proceedings–A, vol. 140, No. 6 (Nov. 1993).

Hagen, Jon B., "Radio–Frequency Electronics: Circuits and Applications", pp. 115–123, Cambridge University Press (1996).

Kipling, Kent, et al., "Low Wattage, Solid State Electrodeless Lamp Having Brightness", *Journal of Technical Disclosure*, (Oct. 1, 1998).

"Low Wattage Solid State Electrodeless Lamp Having High Brightness", *Research Disclosure*, pp. 1341–1344 (Oct. 1998).

Martin, Jose L.J. and González, Francisco J.O., "Accurate Linear Oscillator Analysis and Design", *Microwave Journal*, pp. 22, 24, 26, 28, 30–32, 37 (entire article) (Jun. 1996).

Raab, Frederick, "Class–F Power Amplifiers With Maximally Flat Waveforms", *IEEE Transactions on Microwave Theory and Techniques*, vol. 45(11):2007–2012 (Nov. 1997).

PCT Application No. PCT/US99/00047.

\* cited by examiner

JACKETED LAMP BULB ENVELOPE

CROSS REFERENCE TO RELATED APPLICATIONS

This application is a divisional of application Ser. No. 09/228,230 filed Jan. 11, 1999 now U.S. Pat. No. 6,137,237, and claims priority to provisional application Ser. Nos. 60/071,192, 60/071,284, and 60/071,285, all filed Jan. 13, 1998, 60/083,093, filed Apr. 28, 1998, 60/091,920, filed Jul. 7, 1998, 60/099,288, filed Sept. 4, 1998, 60/102,968, filed Oct. 2, 1998, and 60/109,591, filed Nov. 23, 1998, each of which is herein incorporated by reference in its entirety.

Certain inventions described herein were made with Government support under Contract No. DE-FC01-97EE23776 awarded by the Department of Energy. The Government has certain rights in those inventions.

BACKGROUND

1. Field of the Invention

The invention relates generally to discharge lamps. The invention relates more specifically to novel aperture structures. The present invention also relates to an improved electrodeless aperture lamp, and to an improved method of manufacturing an electrodeless aperture lamp.

2. Related Art

In general, the present invention relates to the type of lamp disclosed in U.S. Pat. No. 5,903,091, which is herein incorporated by reference in its entirety.

Electrodeless lamps are known in the art. Such lamps may be characterized according to the type of discharge they produce. Electrodeless discharges may be classified as either E discharges, microwave discharges, travelling wave discharges, or H discharges. The present invention may be effectively utilized with any of these types of discharge lamps, as well as electroded arc discharge lamps.

A number of parameters characterize highly useful sources of light. These include spectrum, efficiency, brightness, economy, durability (working life), and others. For example, a highly efficient, low wattage light source with a long working life, particularly a light source with high brightness, represents a highly desirable combination of operating features. Electrodeless lamps have the potential to provide a much longer working life than electroded lamps. However, low wattage electrodeless lamps have found only limited commercial applications.

SUMMARY

According to one aspect of the invention, a jacketed lamp bulb envelope includes a ceramic cup having an open end and a partially closed end, the partially closed end defining an aperture, a lamp bulb positioned inside the ceramic cup abutting the aperture, and a reflective ceramic material at least partially covering a portion of the bulb not abutting the aperture. For example, the reflective ceramic material substantially fills an interior volume of the ceramic cup not occupied by the bulb.

According to another aspect of the invention, the ceramic cup comprises a structural feature for aiding in alignment of the jacketed lamp bulb envelope in a lamp. For example, the structural feature comprises a protrusion adapted to mate with a corresponding slot in the lamp. Alternatively, the structural feature comprises an indexing feature adapted to mate with a corresponding feature in the lamp. Alternatively, the structural feature comprises a rim adapted to mate with a corresponding shoulder in the lamp. Alternatively, the structural feature comprises a raised portion on an exterior of the ceramic cup in the area of the aperture, the raised portion being adapted to be readily grasped for positioning the ceramic cup. The ceramic cup may also include a combination of the foregoing structural features.

According to another aspect of the invention, the ceramic cup comprises a external flange about a periphery thereof. For example, the flange may be located proximate the open end of the ceramic cup. Alternatively, the flange may be located proximate the partially closed end of the ceramic cup.

According to another aspect of the invention, a jacketed lamp bulb envelope includes a ceramic cup having an open end and a closed end, a ceramic washer covering the open end of the ceramic cup, the washer defining an aperture therethrough, a lamp bulb positioned inside the ceramic cup abutting the aperture, and a reflective ceramic material filling an interior volume of the ceramic cup not occupied by the bulb.

According to another aspect of the invention, a method of packing a jacketed lamp bulb envelope of the type comprising a ceramic cup with a lamp bulb disposed therein includes the steps of filling the ceramic cup with a flowable slurry of reflective material, and applying centrifugal force to the cup to pack the reflective material therein.

The foregoing and other aspects of the invention are achieved individually and in combination. The invention should not be construed as requiring two or more of the foregoing aspects unless expressly required by the claims.

BRIEF DESCRIPTION OF THE DRAWINGS

The invention will be better understood with reference to the accompanying figures, wherein.

DESCRIPTION

Embodiments of the present invention can be utilized to provide a highly efficient, low power light source with a long working life, particularly a light source with high brightness, which represents a highly desirable combination of operating features. Brightness, as used herein, is defined as the amount of light per unit solid angle per unit of light source area.

Figure 1:
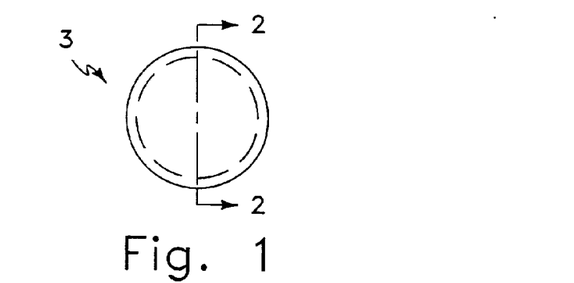
FIG. 1 is a schematic view of a preferred bulb blank for use in the lamp of the present invention.
Figure 2:
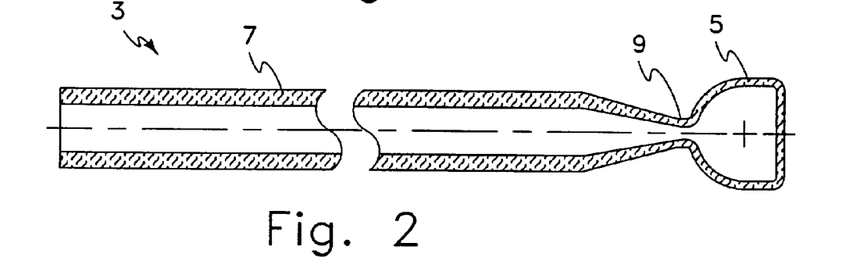
FIG. 2 is a cross sectional view of the preferred bulb blank taken along line 2—2 in FIG. 1.

With reference to FIGS. 1–2, a bulb blank 3 is rotationally symmetric about the longitudinal axis. For example, the bulb blank is made in accordance with the blow molding process described in the parent application. The bulb portion 5 has a general wine glass or goblet shape with a substantially flat face. A suitable fill material is deposited in the bulb blank 3 through the opening in the stem 7. An inert starting gas (e.g. xenon, argon, krypton) is applied to a suitable pressure. The stem is then heated at the pinched portion 9 to seal off the bulb 5 enclosing the fill material and starting gas.

Figure 3:
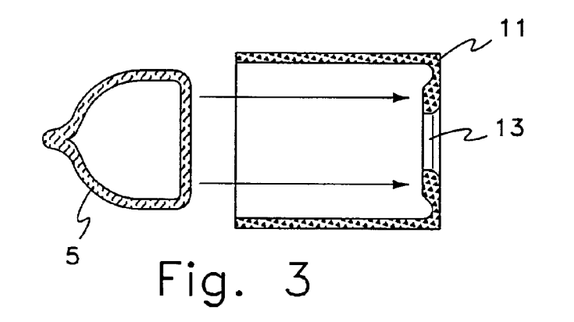
FIG. 3 is an exploded, schematic view of a preferred aperture cup according to the invention.
Figure 4:
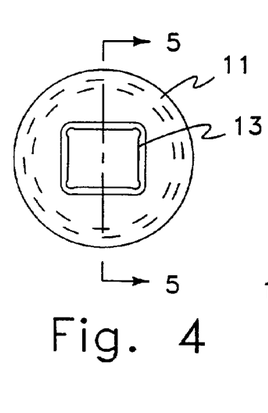
FIG. 4 is a schematic view of the aperture cup showing details of the aperture.
Figure 5:
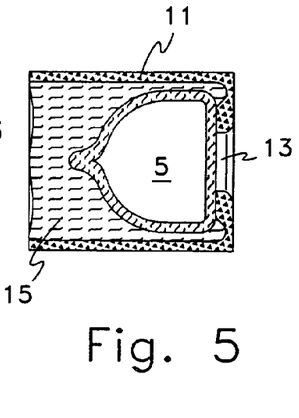
FIG. 5 is a cross sectional view taken along line 5—5 in FIG. 4.

With reference to FIGS. 3–5, the bulb 5 is inserted in a reflective ceramic cup 11 and positioned approximately symmetric with respect to the aperture 13. The cup 11 is then filled with a reflective material 15 which hardens to encase the bulb 5 and secure the bulb 5 in position. Other details of bulb and aperture forming processes are described in the parent application. Preferably, the reflective cup 11 and the reflective material 15 are low dielectric/high (relative) thermal conducting materials to aid in thermal management of the lamp.

Figure 6:
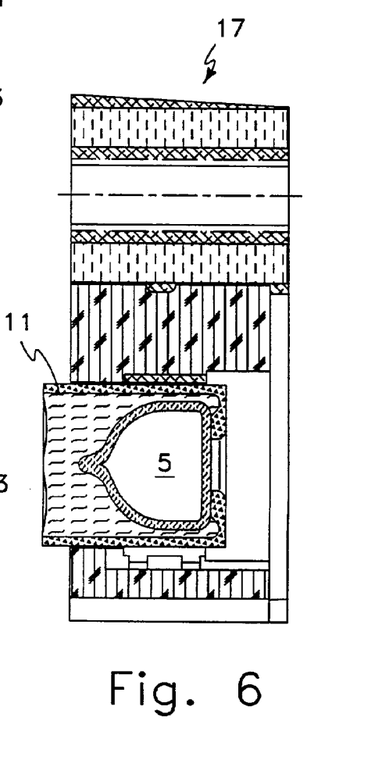
FIG. 6 is a cross sectional view of a lamp head utilizing the jacketed lamp bulb envelope of the present invention.

FIG. 6 is a cross sectional view of a lamp head utilizing the jacketed lamp bulb envelope of the present invention. The aperture cup 11 (enclosing the bulb 5) is inserted in an opening in the lamp head 17. The aperture cup 11 is positioned in the lamp head with the bulb aligned with the wedding ring shaped coil. Other details regarding the construction and operation of the lamp may be had with reference to the parent application.

Figure 7:
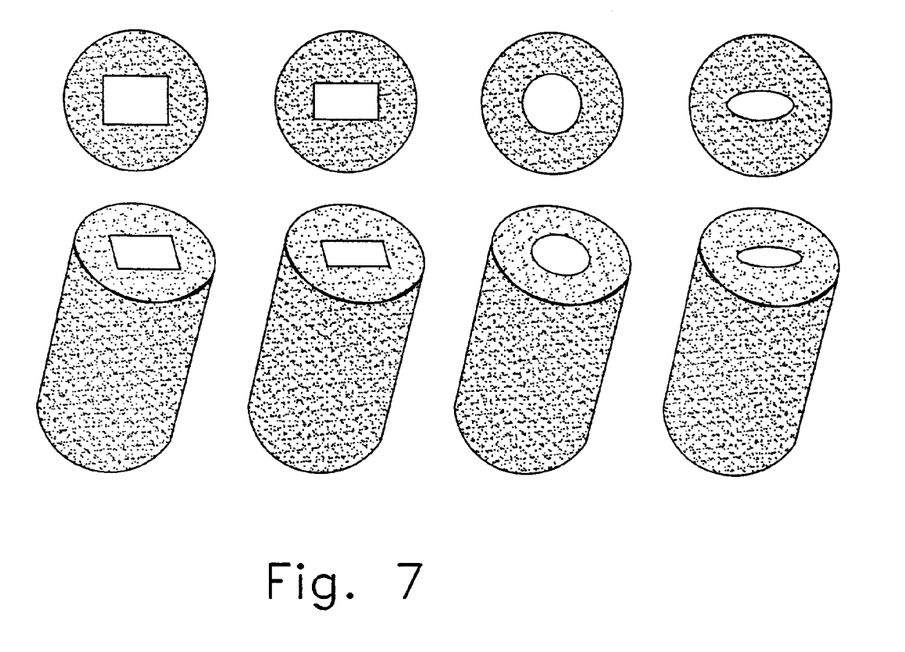
FIG. 7 shows several examples in which a bulb with a flat face is encased in a reflective cup with a variety of apertures shapes.

According to one aspect of the present invention, the shape of the aperture is configured to optimize optical efficiency. For example, a round aperture is utilized when coupling to the circular end of a fiber optic. A rectangular optic of aspect ratio of 3 to 4 or 9 to 16 is utilized when coupling to an LCD display engine. Yet more complex shapes are utilized when generating the beam for an automotive headlamp. For virtually any application an optimally shaped aperture can be designed. Lamps with two or more apertures are also possible. FIG. 7 shows several examples in which a bulb with a flat face is encased in a reflective cup with a variety of apertures shapes.

Exemplary Processes for Filling Aperture Cup

The preferred aperture bulb according to the invention is shown in FIG. 5. A desired aperture shape is pre-formed in a base of a ceramic cup. A quartz bulb having a goblet shape is positioned approximately symmetric with respect to the aperture and with a flat face of the bulb abutting the aperture. The volume of the cup not occupied by the bulb is filled with a reflective ceramic material. Exemplary processes for constructing the illustrated bulb are described below.

Hand Gupping

A slurry or gup comprising 60% Nichia (part no. 999- 42 from Nichia America Co.) and 40% methanol is prepared. The gup should be flowable such that it can be drawn into a 5–10 cc syringe. The cup is placed in methanol and allowed to wet to fill the pores in the cup before gupping. A small amount (about 1 cc) of gup is placed into the cup near the aperture. The bulb is slid up to the aperture, displacing some of the gup through the aperture and around the bulb. The cup is then filled about half full with gup and tapped gently on a flat surface to pack the material (e.g. remove air bubbles or voids). After several minutes of air drying, the material is further packed with a small stick or the like. Additional gup is applied in several increments until the cup is filled, with each application being tapped, dried, and packed as just described. The gup is then removed from the aperture area and the assembly is oven dried at about 100° C. for 10 minutes and then baked at about 900° C. for 30 minutes.

Solid Casting

A slurry is prepared comprising about 70% Nichia, 27% D1 water, and 3% Darvan 821-A. The slurry is rolled for several hours to fully disperse the Nichia. The bulb is glued to the cup from the outside in the area of the aperture and a latex tube is placed over the open end of the cup so that the cup can be overfilled by about 6 mm. The cup is placed in Dl water for about 10–20 seconds to saturate the pores with water. The cup is removed and excess water is blown out of the inside of the cup with compressed air or nitrogen. The slurry is drawn into a syringe and slowly dispensed into the cup taking care to avoid air bubbles. A rubber cap is placed over the latex tube and the slurry is air dried for 2–3 hours. The rubber cap and latex tube are then removed and excess material is trimmed from the end of the cup with a knife or razor blade. The cup is heated at a rate of 10° C./minute up to about 900° C. and then held at 900° C. for about 30 to 60 minutes.

Use of Centrifuge to Pack Cup

Preferably, the resulting reflective ceramic material is dense and without air pockets. In the above-described procedures, there is a trade-off between good flow characteristics an d resulting density. Also, it is time consuming and difficult to avoid air pockets using the above procedures.

According to a present aspect of the invention, the cup is packed with gup using centrifugal forces. For example, using a centrifuge to pack the cup with the slurry facilitates application of significant forces on the slurry which can cause the slurry to flow into small crevices and force air pockets out. Prolonged time in the centrifuge can separate the liquids from the solids thus changing the solid content of the casting. Controlled configurations may be utilized to construct ceramic parts with variable or gradient density. According to the present invention, the centrifuge process increases the density of the resulting reflective ceramic material with a lesser requirement for good flow characteristics.

An exemplary centrifuge process is as follows. A slurry is prepared comprising about 5% Nichia and 95% water or methyl alcohol. The slurry is milled for at least about 1 hour before gupping. The bulb is centered about the aperture and glued from the outside of the cup. A centrifuge fixture is configure to hold the cup so that the aperture end of the cup is radially outward during spinning. The ceramic cup is relatively porous and the water/methyl alcohol seeps through the face of the aperture cup under sufficient centrifugal forces. The fixture may be configured to hold an amount of slurry in excess of the volume of the cups so as to reduce the number of processing steps. The fixture and/or cups are then filled with the slurry and spun at about 3900 revolutions per minute for about 5 minutes or until no further water/alcohol is observed leaking from the fixture. The filling and spinning are repeated until the cup is filled. The cups are then removed from the fixture, oven dried at about 80–90° C. for 30 minutes, and baked at about 900° C. for 30 minutes.

An alternative process is to use a first mixture of 5% Nichia/95% water and a second mixture of 50% Nichia/50% water. The 5/95 mixture is used at least until the bulb is substantially covered with the packed ceramic material. Thereafter, the 50/50 mixture is used to speed processing.

Exemplary Performance Data

Exemplary performance parameters of a lamp utilizing an aperture bulb of the present invention are as follows:

TABLE 5

| | DC Power | Aperture | Brightness | 2D Lumens | CCT | CRI |
|---|---|---|---|---|---|---|
| Case # 1 | 120 W | 9 mm$^2$ | 53 cd/mm$^2$ | 1500 | 6800° K | >90 |
| Case # 2 | 120 W | 18 mm$^2$ | 45 cd/mm$^2$ | 2500 | 7500° K | >90 | where in each case the bulb fill is about 1.8 mg/cc of InBr and the bulb is a wine glass shaped bulb with dimensions of about 7 mm outer diameter and 6 mm inner diameter (bulb interior volume of about 0.1 cc).

Figure 8:
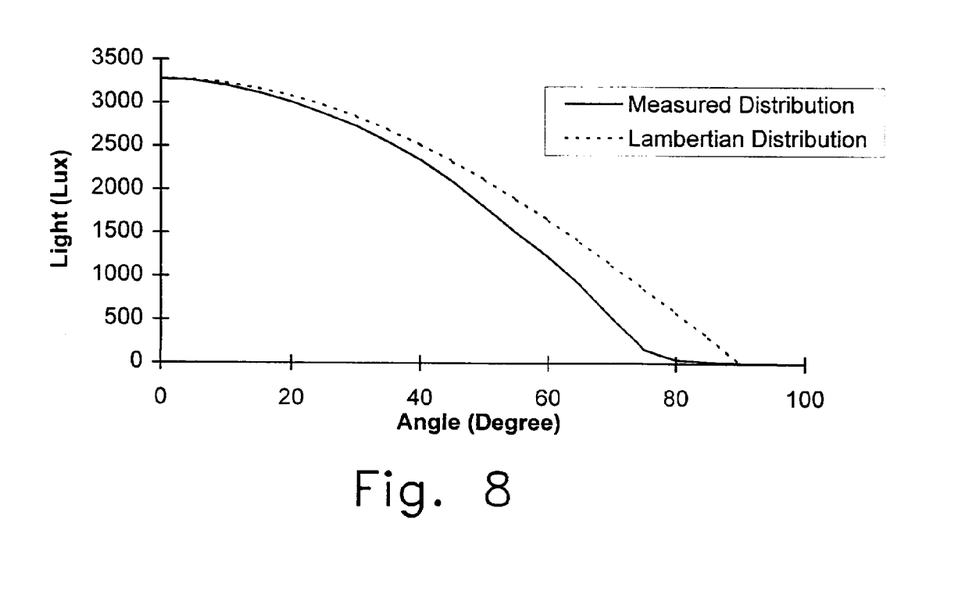
FIG. 8 is a graph of measured angular distribution of light from the lamp of the present invention as compared to a Lambertian distribution of light.

An advantage provided by the lamp and aperture structures of the present invention is a near Lambertian angular distribution of light. FIG. 8 is a graph of measured angular distribution of light from the lamp of the present invention as compared to a Lambertian distribution of light. The near cosine distribution of the light allows for the efficient generation of highly collimated shafts of light. Both imaging and non-imaging optical elements can be matched to the aperture to achieve the desired beam angle.

The aperture lamp topology holds other important advantages. By adjusting the size of the aperture relative to the size of the bulb, the lamp of the present invention can trade lumen efficacy for source brightness. A smaller aperture port will yield lower lumen efficacy, but higher source brightness. Conversely, a larger aperture increases the luminous flux but reduces the brightness of the source. For example, an efficient light source which is excellent for general illumination is achieved by opening the aperture to match or nearly match the bulb diameter. In such a configuration, the lamp of the present invention is readily adapted to up light or down light fixtures to provide effective lighting for office environments, schools, factories, shops, homes, and virtually anywhere which requires or benefits from artificial lighting.

The shape of the bulb can likewise be varied to optimize coupling to the RF field and to the optical aperture. For example, a bulb shaped like the top of a wine glass with a flat face on top works well for a lamp with a single aperture. A bulb shaped like a hockey puck could be chosen for better optical coupling when two oppositely disposed apertures are desired. The size of the bulb can also be varied. In general the size of the bulb is a function of power level and the required source brightness. In general, larger bulbs are required for higher power levels. At a given power level a small bulb with a smaller aperture will produce a brighter source. Bulbs can be constructed from a variety of materials, glass, quartz, alumina, etc. The bulb envelop does not need to be transparent, only translucent. Any material that is translucent, can withstand the necessary operating temperatures, is chemically inert to the chosen fill and does not excessively interfere with the RF wave can be used.

Traditional light sources emit light in three dimensions. A reflector is typically used to redirect and focus the light onto the desired object or plane. For the illumination of large areas these tried and true techniques work fine. However, when a narrow, highly collimated light beam is needed, conventional light sources are quite inefficient. Moreover, many conventional lamps provide only a localized bright spot, with most of the source lumens emanating from a different, significantly less bright portion of the discharge.

Figure 9:
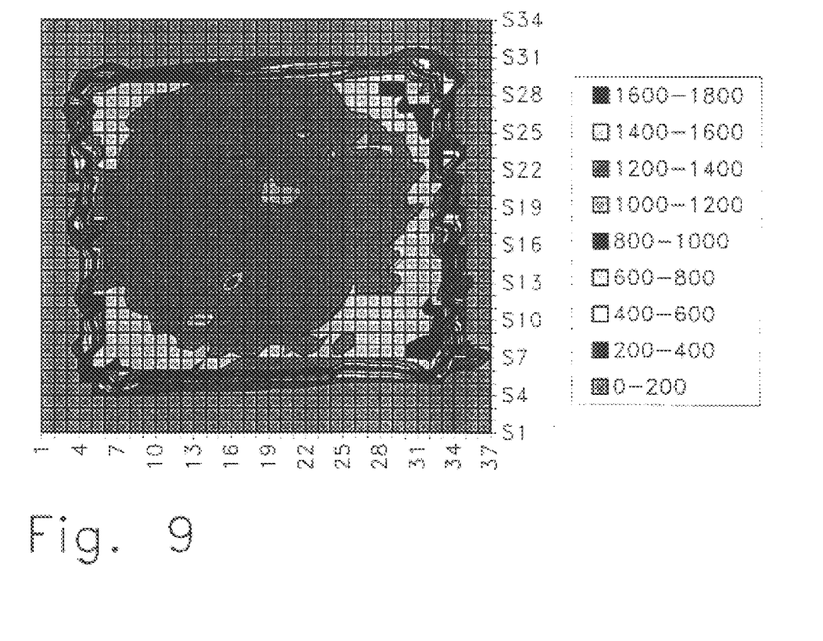
FIG. 9 is a graph of near field distribution.
Figure 10:
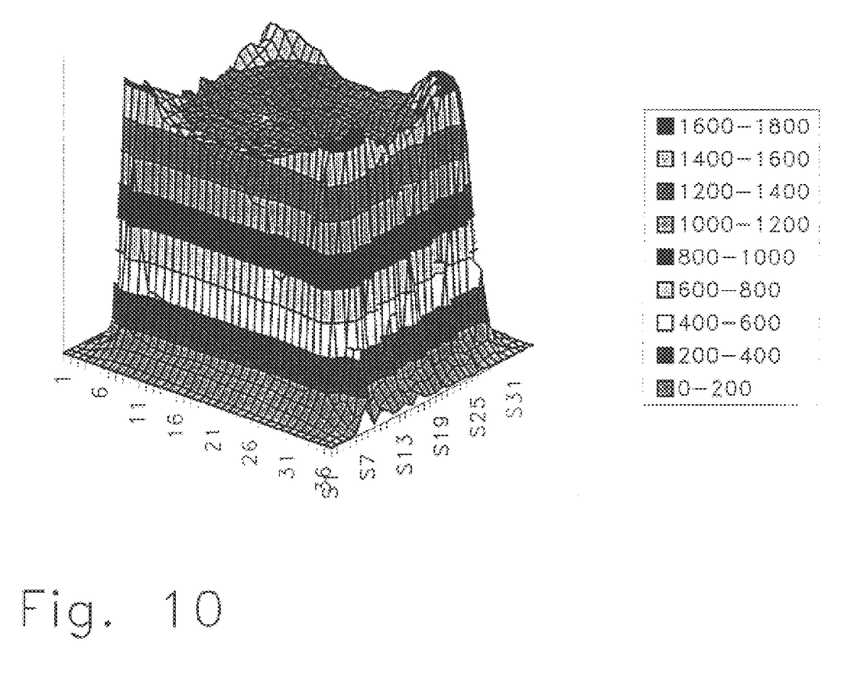
FIG. 10 is a three dimensional graph of an exemplary near field distribution of the lamp of the present invention.

In contrast to conventional light sources, light emitted from the lamp of the present invention aperture is directed in only two dimensions. In other words, the brightness is uniform with little deviation between the peak and average brightness across a two dimensional area. FIG. 9 is a graph of an exemplary intensity map of the lamp of the present invention for a near field distribution. FIG. 10 is a three dimensional graph of an exemplary near field distribution of the lamp of the present invention.

A low étendue is a necessary but not sufficient feature for efficiently coupling of light into small optical systems such as fiber optics or small diagonal LCDs. The other necessary feature to maximize coupling is the match of skewness distribution between source and target. Unless the source and target skewness distributions are well matched, it is difficult to maintain both low etendue and high collection efficiency. Generally, three-dimensional light sources do not provide a good match of skewness distribution with planar targets such as fiber optics or LCDs. For example, it is well known in the art that transferring light from a spherical source with axially symmetric optics causes a loss of etendue or collection efficiency or both.

Advantageously, the lamp of the present invention provides both low etendue and an excellent skewness match for planar targets. The two-dimensional light source provided by the lamp of the present invention maximizes the collection efficiency for optical systems in which it is also necessary to maintain low etendue.

The foregoing advantages concerning low etendue, skewness match, and angular distribution can be effectively utilized by reflective, refractive, imaging, and non-imaging optics to create bright and efficient optical systems. For example, the angular distribution of the lamp of the present invention is well suited to all types of collection optics such as reflective or refractive compound parabolic concentrators (CPCs) and light pipes, and a variety of imaging optical solutions.

While the lamps described in the parent application use an inductive RF coupling structure, the benefits of the aperture lamp technology is broadly applicable when used with other coupling structures.

Spectral Distribution

Figure 11:
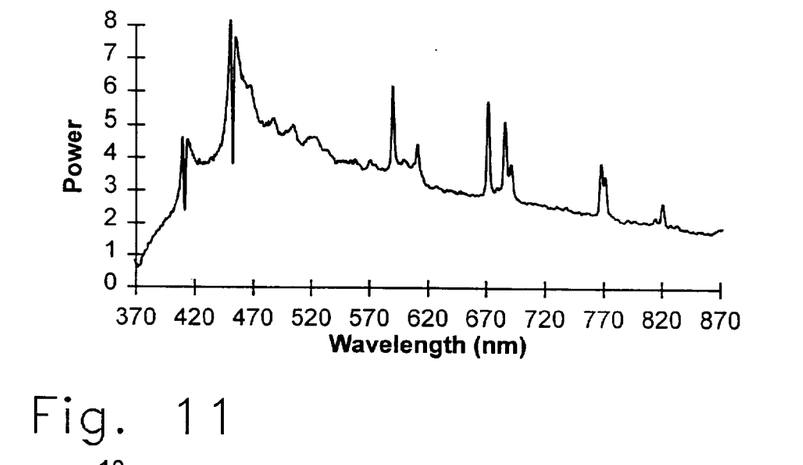
FIG. 11 is a graph of spectral power distribution for an indium bromide only fill as described above.
Figure 12:
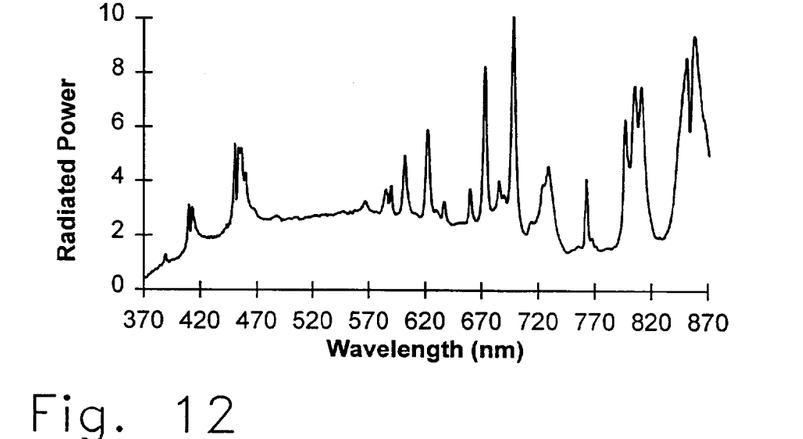
FIG. 12 is a graph of spectral power distribution for a fill including indium bromide and cesium bromide.
Figure 13:
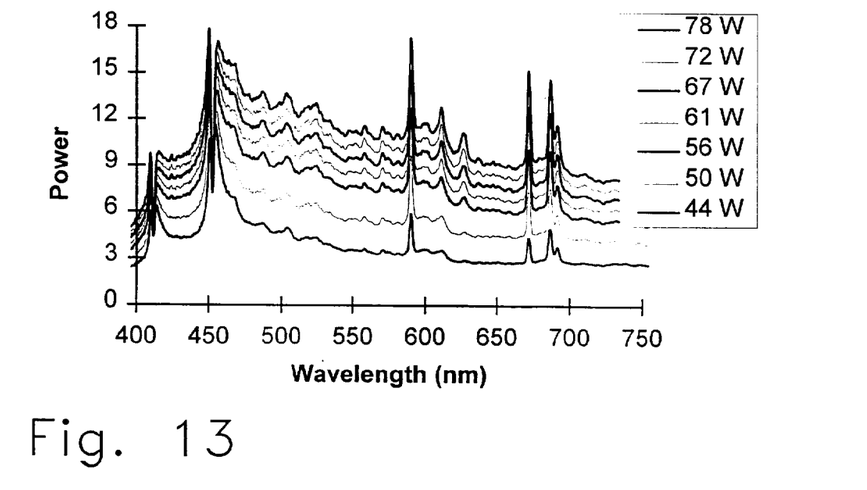
FIG. 13 is a graph of spectral power distribution for an indium bromide only fill at varying levels of RF power.

The aperture bulb technology described herein, coupled with selected bulb fills, delivers full spectral light at high CRI and color temperatures which are excellent for many applications. Color temperature and spectral balance can be tailored by choice of bulb fill chemistries and dose. The lamp of the present invention can also utilize fills and/or filters to produce light of specific color bands. A full range of bulb fill materials from conventional mercury and metal halides to sulfur and selenium can be used in the lamp of the present invention. FIG. 11 is a graph of spectral power distribution for an indium bromide only fill as described above. FIG. 12 is a graph of spectral power distribution for a fill including indium bromide and cesium bromide (0.8 mg/cc InBr, 0.2 mg/cc CsBr, 50 Torr Kr). Unlike most other discharge lamps, the light output of the lamp of the present invention can be readily dimmed. FIG. 13 is a graph of spectral power distribution for an indium bromide only fill at varying levels of RF power.

Ceramo-quartz Lamp

Electrodeless lamps of the type with which the present invention is concerned are comprised of a light transmissive bulb having an envelope containing a plasma-forming medium. A microwave or radio frequency (RF) energy source has its output energy coupled to the envelope via a coupling arrangement to excite a plasma, resulting in a light discharge. The envelope is embedded in or surrounded by a jacket of reflective material over nearly the entire envelope surface, except for a small area, known as an aperture, through which light is permitted to pass.

The parent application discusses a method of manufacturing an electrodeless aperture lamp which possesses certain advantages over the prior art. In the aperture structures discussed in the parent application, a mold cavity is provided, an aperture forming member is inserted therein, a lamp envelope is placed therein proximate the aperture forming member, and the interior of the mold cavity is filled with a flowable, reflective material, which after hardening forms a jacket around the lamp envelope.

A present aspect of the invention is directed to a method of manufacturing an electrodeless aperture lamp which possesses other advantages over the prior art.

It is important for certain methods of making electrodeless lamps to be easily accomplished by mass production so that large production quotas can be readily filled. It is also important that the resulting lamp be durable, so that its longevity is increased. The electrodeless lamps to which the invention pertain operate at a high temperature and become very hot, especially during operation over extended periods. It is therefore important to remove the heat from the bulb, which is made of quartz, and will otherwise melt. To accomplish this, the heat is transmitted from the bulb to a heat sink where the heat is dissipated, and it is desirable for the transmission of the heat from the bulb to the heat sink to be high.

It is thus an object of one aspect of the present invention to provide a method of making an electrodeless aperture lamp which is easy to implement and lends itself to the economies of mass production.

It is a further object of one aspect of the invention to provide an electrodeless aperture lamp which is durable.

It is still a further object of the invention to provide an electrodeless aperture lamp which has a high heat transmission characteristic.

It should be understood that the above objects are achieved individually and in combination with each other, so the invention should not be construed as requiring two or more of the objects to be combined.

First Example of a Ceramo-quartz Aperture Structure

Figure 14:
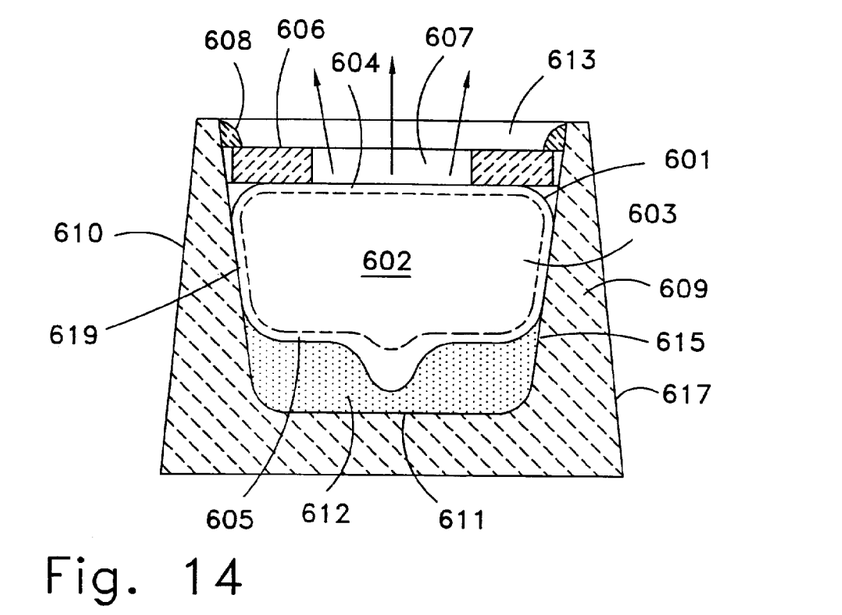
FIG. 14 shows a ceramo-quartz aperture lamp bulb in accordance with a first embodiment of one aspect of the invention.

A lamp bulb in accordance with a first example of the present invention is depicted in FIG. 14. A lamp envelope 602 is shown which is typically made of quartz and is filled with a discharge forming medium which emits light when excited. By way of non-limiting example, a possible fill is a sulfur or selenium based substance, as disclosed in the above-mentioned U.S. Pat. No. 5,404,076. Also, the envelope may be made by the methods discussed in the parent application.

The envelope is located in a container 610 which has a closed end 611, and a side wall 609 which opens into a mouth 613. The side wall has an inside surface 615 and an outside surface 617, and at least the portion of the inside surface 615 which abuts the lamp envelope is arranged to be reflective. In the preferred example, the container 610 is made of reflective, ceramic material, and is cup-shaped.

Between the lamp envelope 602 and the container end 611 is a reflective fill material 612 which, as shown, fills the region between the container end and the lamp envelope. In the preferred example, this material is a reflective ceramic having a lower density than the ceramic of which the container 610 is made. For example, the fill material 612 may be a hardened slurry or powder.

A bulb surface 604, which faces the container mouth 613 has a washer 606, at least the inside surface of which is reflective, secured thereto, e.g., with a ring 608 of bonding material. The washer comprises an aperture-forming member which forms an aperture 607, and in the preferred example is made of reflective, ceramic material. The bulb surface 604 is preferably flat to allow for easy attachment of the washer 606, although the washer can be secured to rounded surface portions 601 also.

The inside surface 615 of the container side wall is conical in shape and tapers toward the container end. In the preferred example, it has circular-cross-sections of progressively decreasing diameters in the direction towards the container end. The lamp envelope 602 has a side wall 619 in the preferred example which is also conical in shape. It is congruent with the inside surface 615 of the container side wall, and abuts such inside surface. The outside surface 617 of the container wall is also conically tapered, and in the preferred example, tapers in the opposite direction from the inside surface.

Figure 15:
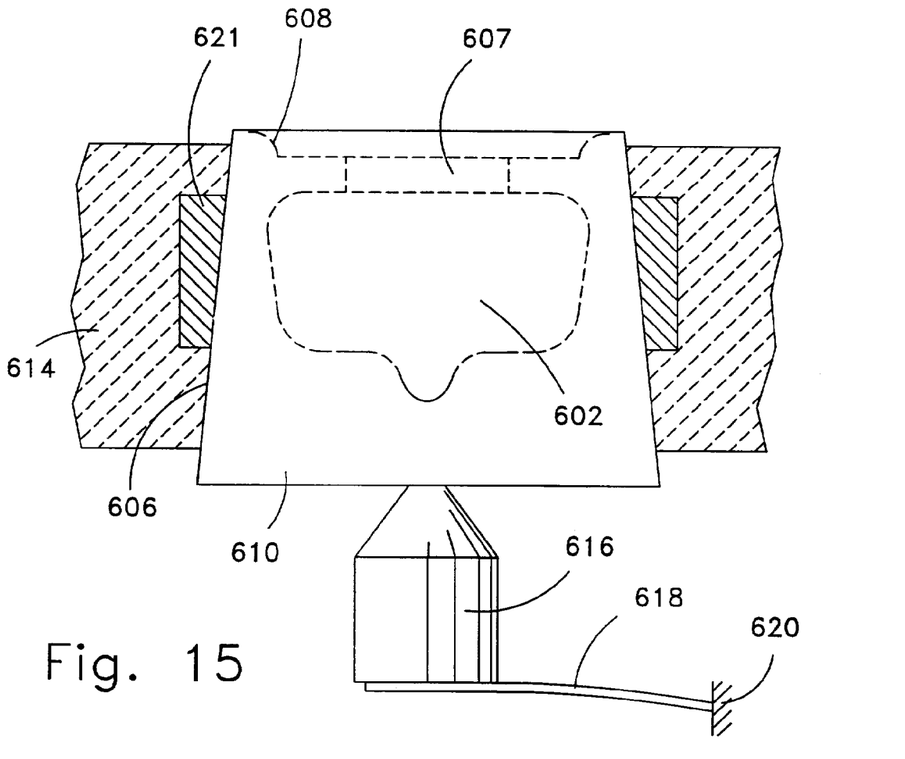
FIG. 15 shows the embodiment of FIG. 14 combined with an excitation coil and heat sink.

FIG. 15 shows a lamp which incorporates the aperture lamp bulb of FIG. 14. An excitation coil 621, which may be in the form of a metallic band, is disposed around the container 610, while a heat sink 614, which may be made of a boron-nitride ceramic material surrounds the bulb and excitation coil. A plunger 616 which is biased by a spring 618, attached to a support 620, prevents movement of the lamp when it is turned off and physical contraction takes place due to cooling. It is noted that the inside surface 622 of the excitation coil 621 is tapered so as to mate with the taper of the outside surface 617 of the container wall.

The bulb shown in FIG. 14 and the lamp depicted in FIG. 15 possess many advantages, which will be described in greater detail below.

Figure 16:
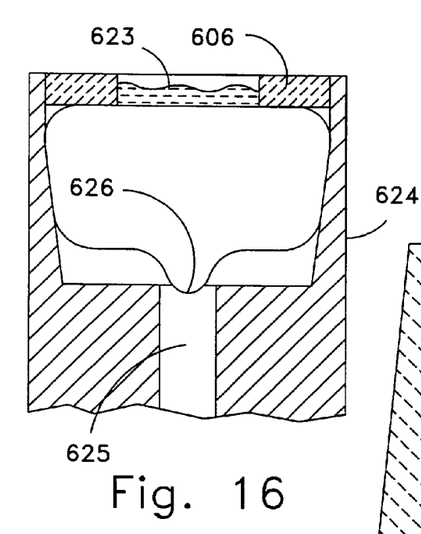
FIGS. 16–19 illustrate an embodiment of a method for making the bulb depicted in FIG.14.

FIGS. 16 to 19 illustrate an example of the method of the invention. Referring to FIG. 16, the washer 606, which may be made of reflective ceramic is first cemented to the lamp envelope 602 with cement 623, which is preferably an organic material selected to decompose at the temperature used to dry, cure, or sinter the reflective material in the present invention.

The ceramic washer may be made of an alumina/silica combination, e.g., 90% alumina and 10% silica with a desired porosity. As is known to those skilled in the art, ceramic technology is available to easily mass produce such washers by mold pressing ceramic bodies as they are transported on a conveyor belt. To accomplish the cementing of the washer 606 to the bulb envelope, lamp envelope 602 is placed in a holder 624 which is of a similar shape as the bulb. The holder 624 has a centrally located opening 625 in which the bulb tip 626 may be inserted to effectively hold the lamp envelope 602 steady during the cementing step.

Figure 17:
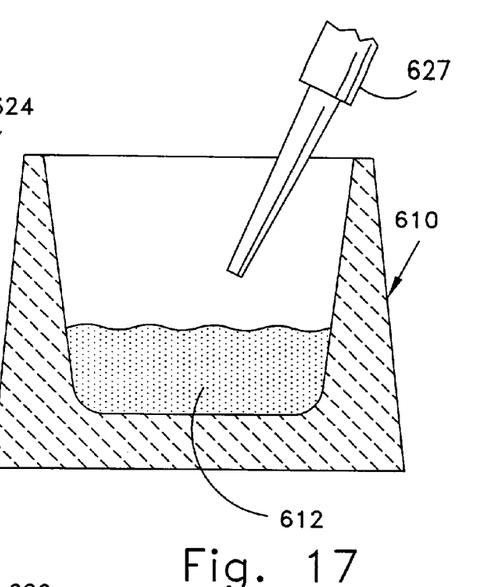

As shown in FIG. 17, the container 610 is provided, which may be cup-shaped. The container 610 may be of relatively high density ceramic material, e.g., the same material as the washer. The container 610 may be made in a mold, and is easy to mass produce with known ceramics technology. As noted above, the side wall of the container has inside and outside surfaces which are conically shaped, with the inside surface tapering towards the container bottom while the outside surface tapers towards the container top.

The next step of the method is to fill the container 610 with a reflective slurry or powder 612 to a predetermined level, e.g., with a nozzle 627 which is fed by a source of the slurry or powder. The slurry or powder is preferably made of a relatively low density ceramic material, e.g., substantially pure alumina mixed with water and a small amount of organic additive to prevent sedimentation.

Figures 18, 19:
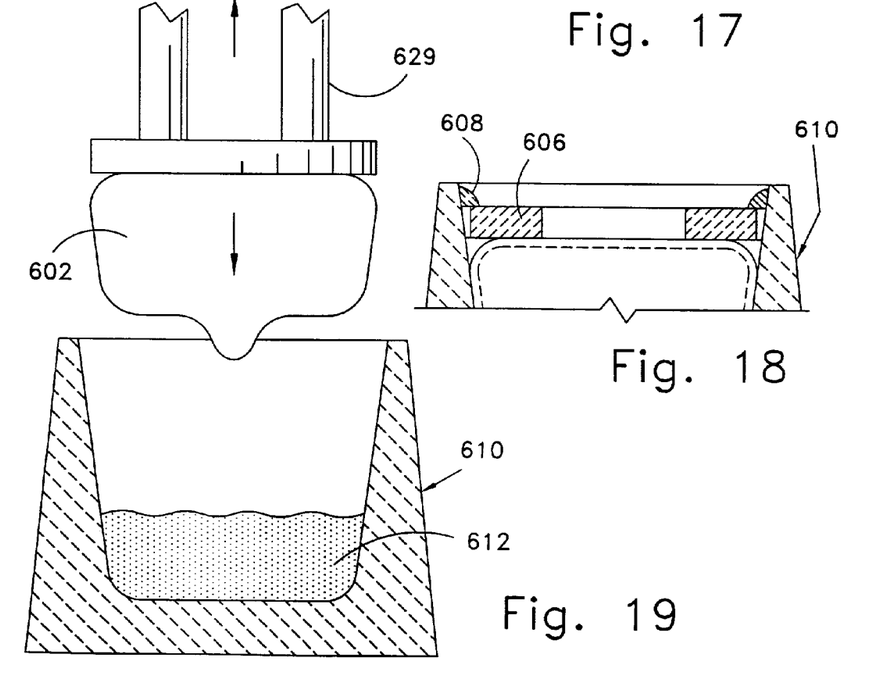

The next step is shown in FIG. 18, and is comprised of inserting the bulb envelope/ceramic washer combination in the container 610. A vacuum holder 629 may be used to hold and lower the envelope into the proper position, which is shown in FIG. 14. After the lamp envelope is in the correct position, as shown in FIG. 19, the ring 608 of ceramic bonding material is applied to secure the ceramic washer 606 to the wall of container 610. The ceramo bond has a paste-like consistency, and is typically made of a combination of alumina and silica powders combined with organics.

The slurry is allowed to harden by drying, and the next step in the method is to cure the lamp bulb in an oven in order to cure the slurry and ceramo bond. Curing of the slurry may be at a temperature of at least 500° C. and may be done for a period of 15 to 20 minutes, while curing of the ceramo bond may be at about 50° C. and may take 1 to 2 hours to finish. If a powder is used, the powder may be heated and/or partially sintered.

It can now be appreciated the method of the invention described above provides an easy way to manufacture an aperture lamp, which can be conveniently accomplished by mass production. Additionally, it follows from the method that the lamp which is produced is quite durable.

Referring to FIG. 14 again, it is seen that the conical side wall 619 of the lamp envelope 602 abuts the inside surface 615 of container side wall 609. The mating tapered surfaces provide sure contact, which facilitates heat transfer away from the lamp envelope, ensuring that the lamp operates at a low enough temperature.

Referring to FIG. 15, it is seen that the inside surface 622 of excitation coil 621 is tapered so as to mate with the outside surface 617 of the container side wall. The inside surface of the annularly shaped heat sink 614 is similarly tapered. The mating tapered surfaces provide sure contact therebetween, resulting in high heat transfer. In the preferred example, the taper of both the inside and outside surfaces of the container side wall is between 0.5° and 2.0°.

Referring again to FIG. 14, it is seen that the washer 606 forms the aperture 607 through which light exits the bulb. The use of a flat washer as an aperture forming member is one of the improvements of the present invention, since this part is standardized and easy to manufacture and install. In some lamp applications, the washer would be used as shown, while in other applications, additional light extraction members such as fiber optics would be associated with the washer, for controlling the light as desired.

Second Example of a Ceramo-quartz Aperture Structure

Figure 20:
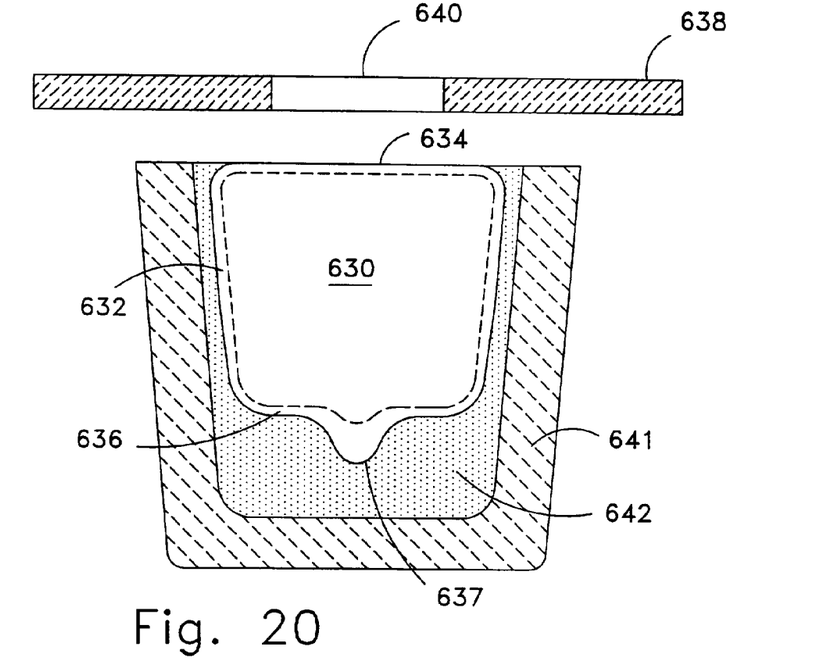
FIG. 20 shows an aperture lamp bulb in accordance with a second embodiment of the invention.

Referring to FIG. 20, a second example of an aperture lamp bulb in accordance with the invention is shown. In this example, the entire region in the container between the side wall and the lamp envelope is filled with a reflective fill material 642.

Figure 21:
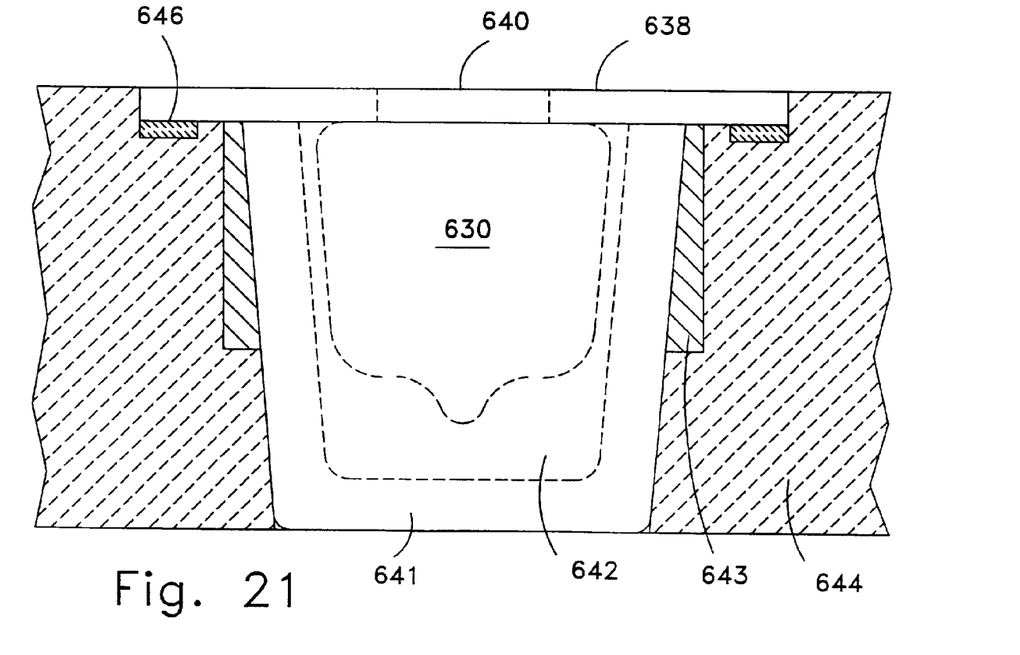
FIG. 21 shows the bulb of FIG. 20 combined with an excitation coil and heat sink.

Referring to the aperture lamp of FIG. 21, it is noted that a ceramic washer 638 is wider than in the first example, and is joined to the heat sink 644 with ceramo bond 646. The flange provided by the oversized washer 638 facilitates heat transfer away from the bulb. The other components depicted in FIGS. 20 and 21 are similar to the corresponding components of FIGS. 14 and 15.

Figure 22:
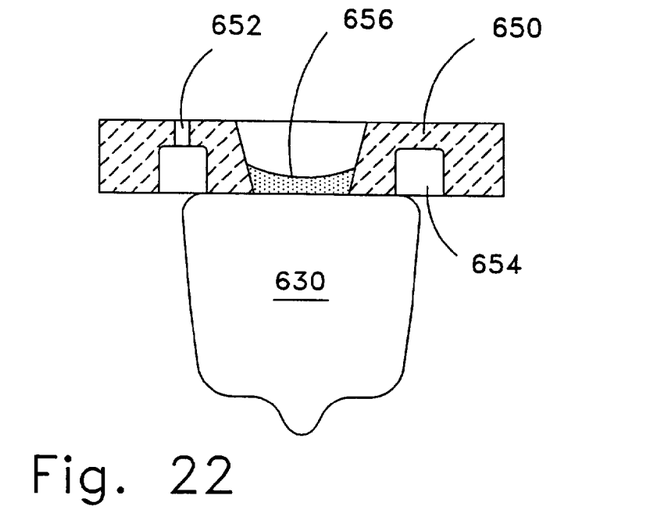
FIGS. 22–25 show an embodiment of a method of making the bulb of FIG. 20.

The method of manufacturing the example of FIGS. 20 and 21 is illustrated in FIGS. 22 to 25. Referring to FIG. 22, the first step is comprised of cementing a technological ceramic washer 650 to the top flat surface of a lamp envelope 630 with cement 656, as explained in connection with the prior example. The technological washer 650 has a circular channel 654 therein, which leads to an orifice 652.

Figure 23:
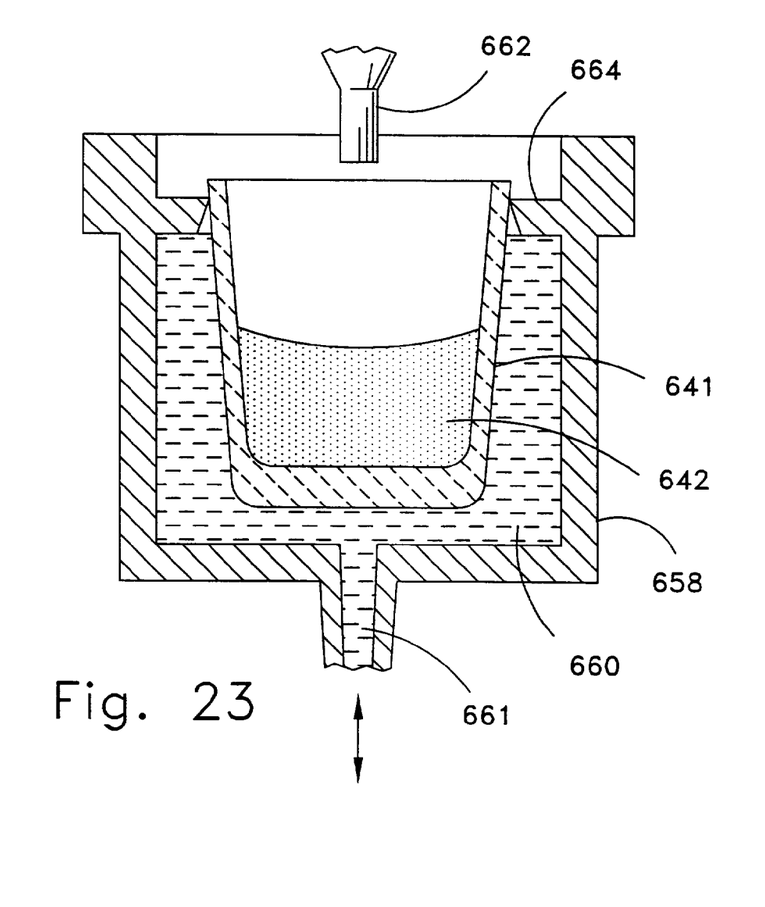

Referring to FIG. 23, a container 641 is provided, which may be cup-shaped, and is made of ceramic which may be reflective. A vessel 658 is also provided, to which water may be supplied and extracted through an inlet/outlet 661.

The container 641 is inserted in the vessel 658 until its side wall abuts ledge 664 in the vessel. Water 660 is then caused to flow into the vessel 658 as shown. Then, container 641 is filled with reflective, flowable material such as a ceramic slurry to a predetermined level through nozzle 662. The purpose of the water is to exert pressure on the ceramic container 641 and seal its pores. This prevents liquid from leaking, which would cause the slurry to dry out.

Figure 24:
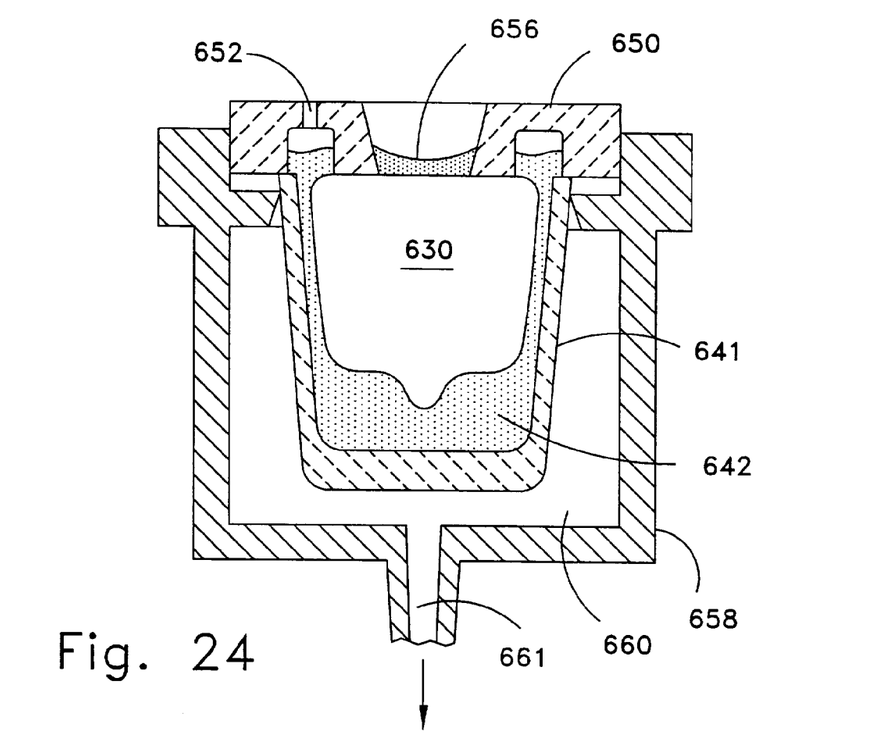

Then, referring to FIG. 24, the water 660 is evacuated from the vessel 658 and the lamp envelope/technological washer combination is inserted in the container 641. This causes part of the slurry 642 to flow into the channel 654 of the technological washer 650. It is necessary to overfill the container 641 with slurry, since in the thermal curing step, the slurry will shrink.

Figure 25:
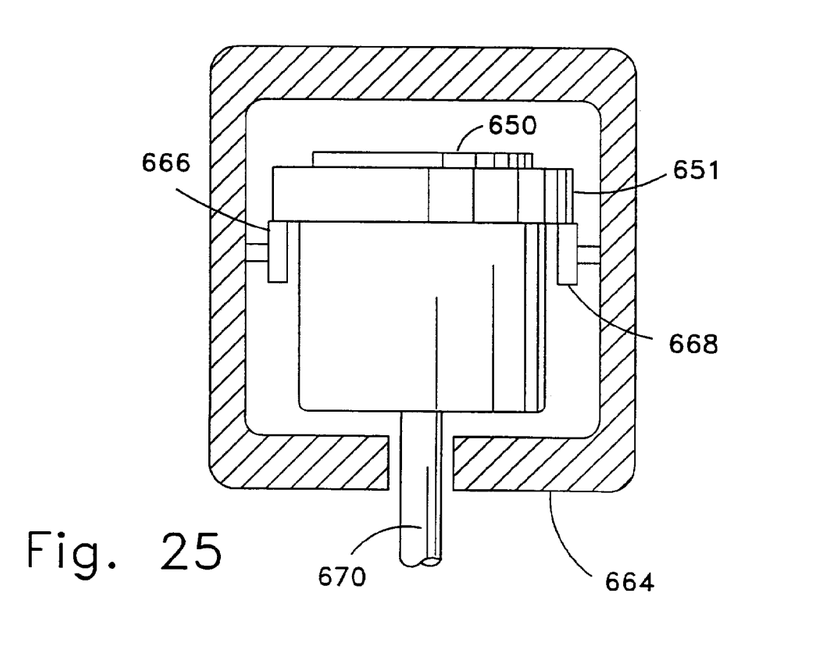

After drying of the slurry, the entire assembly shown in FIG. 24 is placed in tunnel oven 664, shown in FIG. 25, for thermal curing. Supports 668 are located in the interior of the oven for holding the assembly of FIG. 24. After curing the face of the bulb is cleaned of foreign material.

In the resulting lamp bulb, the hardened slurry 642 forms a jacket which covers the surface of envelope 630, but which does not uniformly adhere to or coat the envelope. Referring to FIG. 21, a ceramic heat sink 644, which may be boron nitride has an annular cross section, and is cemented to the container 641 and a coil 643. The heat sink has an annular channel therein near the top as depicted in FIG. 21, and ceramo bond 646 joining the washer 638 to the heat sink 644 is located in this channel. The large size of the washer and ceramo bond connection to the heat sink promote heat transfer from the bulb.

Design Feature for Alignment of the Aperture Cup

A preferred aperture cup/bulb assembly is shown in FIGS. 3–5. This assembly is axially, radially, and rotationally aligned in the lamp head, as shown in FIG. 6. According to a present aspect of the invention, the aperture cup is provided with structural features for aiding the alignment of the assembly.

Figure 26:
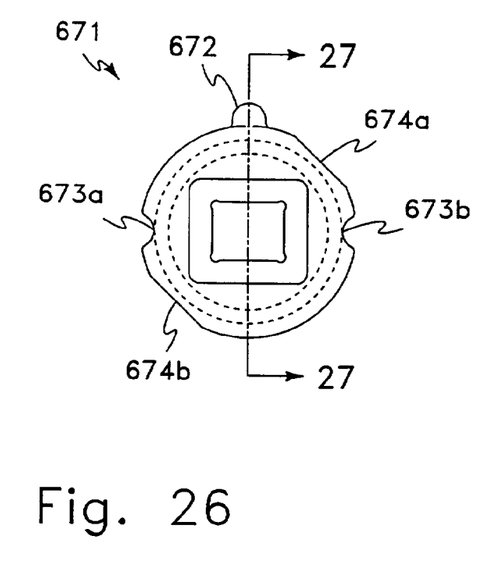
FIG. 26 is a schematic view of an aperture cup 671 according to the invention.
Figure 27:
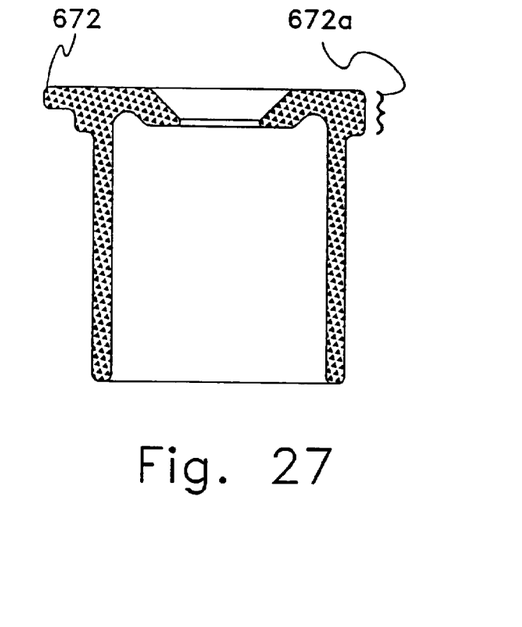
FIG. 27 is a cross-sectional view taken along line 27—27 in FIG. 26.

With reference to FIGS. 26–27, the aperture cup 671 includes several features for aiding alignment, including a protrusion 672, notches 673a and 673b, and flattened portions 674a and 674b. These features may be used individually or in combination as shown.

For example, the protrusion 672 may be sized to fit with a drilled area in the lamp head, as illustrated in the parent application, to provide rotational alignment of the assembly. As shown in FIG. 27, the aperture cup 671 further includes a rim 672a which acts as a stop (e.g. abutting the excitation coil) when the assembly is placed inside the lamp head at a desired axial alignment.

Figure 28:
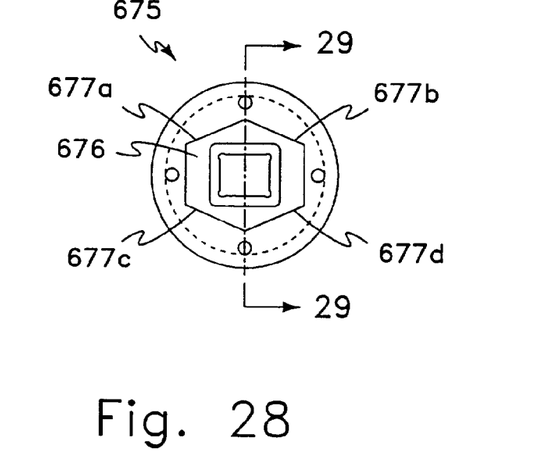
FIG. 28 is a schematic view of an alternative aperture cup 675 according to the invention.
Figure 29:
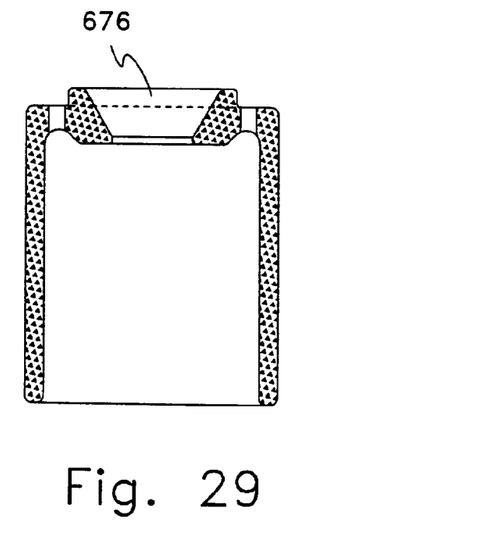
FIG. 29 is a cross-sectional view taken along line 29—29 in FIG. 28.

With reference to FIGS. 28–29, the aperture cup 675 includes a raised portion 676 surrounding the aperture area. The raised portion 676 includes outside edges 677a–d which form a polygon. In the example shown, the polygon is a non-equiangular hexagon. The raised portion 676 may be readily grasped and aligned by automated component assembly equipment. For example, a fixture utilizing mating v-shaped fingers which move synchronously in diametrically opposite directions would be suitable to capture the aperture cup 675 in a repeatable rotational orientation. The automated component assembly equipment can be readily adapted to position the captured cup axially and radially in the lamp head. The angled orientation of the faces 677a, 667b and 677c, 677d accommodates a certain amount of dimensional variations while still facilitating accurate rotational alignment.

Flanged Aperture Cup

Figures 30, 32:
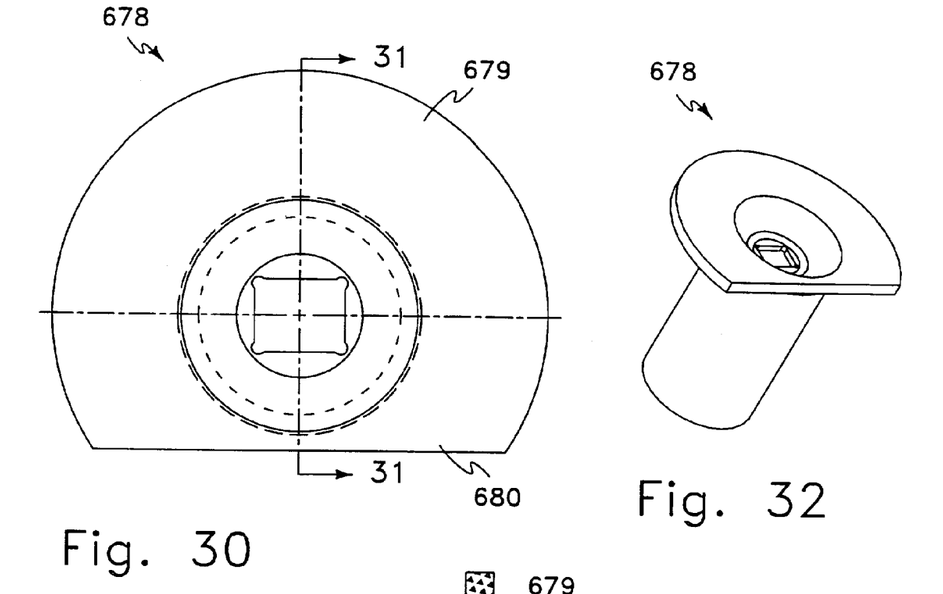
FIG. 30 is a schematic view of an alternative, preferred aperture cup 678 according to the present invention.
FIG. 32 is a perspective view of the aperture cup 678.
Figures 31, 33, 34:
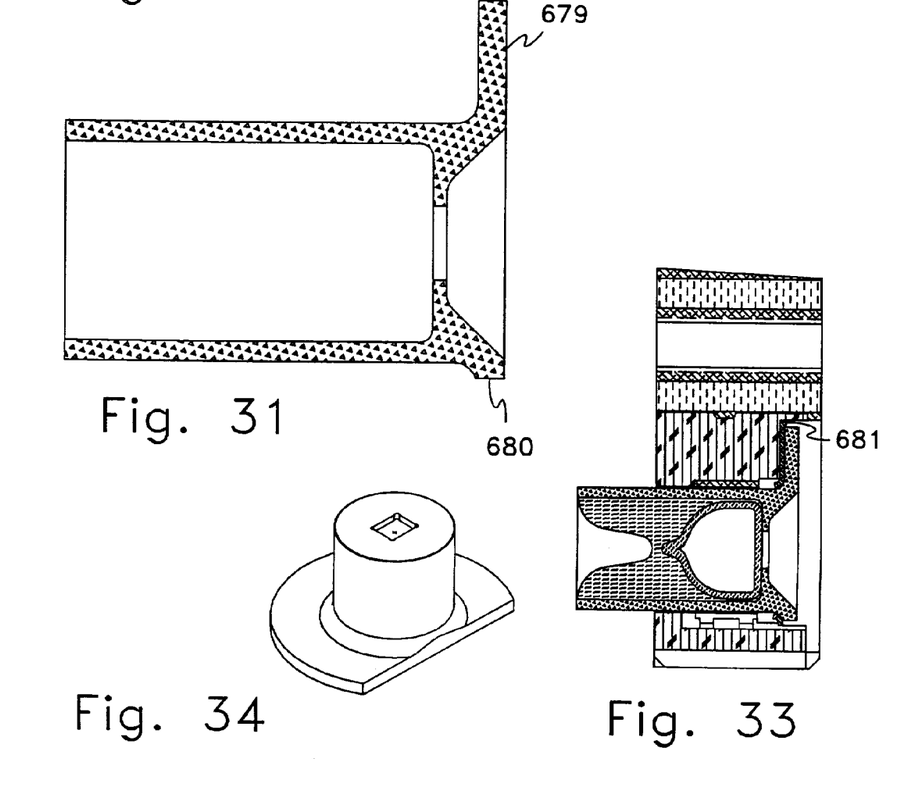
FIG. 31 is a cross-sectional view taken along line 31—31 in FIG. 30.
FIG. 33 is a cross-sectional view of an integrated lamp head according to the invention utilizing a flanged aperture cup.
FIG. 34 is a perspective view of an alternative flanged aperture cup with the flange at the end of the cup opposite from the end with the aperture.

With reference to FIGS. 30–32, the cup 678 includes a flange portion 679 extending from an end of the cup 678. The cup 678 may be made out of a ceramic material for, for example, fully densified alumina. Preferably, the flange cup 678 comprises about 90% alumina, 10% silica with a porosity of about 17% to 20%. As illustrated, the flange 679 is semi-circular with a flattened portion 680 along its periphery. A preferred bulb for the flanged cup is a 6.5 mm OD, 5.5 mm ID spherical bulb filled with 0.16 mg InBr and 30 Torr Kr.

The flanged cup 678 may be used an integrated lamp head as shown in FIG. 33. Preferably, the BN insert is counter-bored to mate with the flange portion 679 to provide axial, radial, and rotational alignment of the cup, and to promote heat transfer away from the bulb. Thermal putty 681 (e.g. T-putty 502) is applied between the flange cup 678 and the BN insert around an outer periphery of the flange 679. FIG. 34 is a perspective view of an alternative flanged aperture cup with the flange at the end of the cup opposite from the end with the aperture.

While the invention has been described with respect to specific examples, the invention is not so limited. Based on the drawings, the detailed description, and the teachings set forth herein, numerous other examples will occur to those skilled in the art. The preceding examples should be considered as illustrative only, with the scope and spirit of the invention being set forth in the following claims.

What is claimed is:

1. A jacketed lamp bulb envelope, comprising:
   a ceramic cup having an open end and a partially closed end, the partially closed end defining an aperture;
   a lamp bulb positioned inside the ceramic cup abutting the aperture; and
   a reflective ceramic material at least partially covering a portion of the bulb not abutting the aperture.

2. The jacketed lamp bulb envelope as recited in claim 1, wherein the reflective ceramic material substantially fills an interior volume of the ceramic cup not occupied by the bulb.

3. The jacketed lamp bulb envelope as recited in claim 1, wherein the ceramic cup comprises a structural feature for aiding in alignment of the jacketed lamp bulb envelope in a lamp.

4. The jacketed lamp bulb envelope as recited in claim 3, wherein the structural feature comprises a protrusion adapted to mate with a corresponding slot in the lamp.

5. The jacketed lamp bulb envelope as recited in claim 3, wherein the structural feature comprises an indexing feature adapted to mate with a corresponding feature in the lamp.

6. The jacketed lamp bulb envelope as recited in claim 3, wherein the structural feature comprises a rim adapted to mate with a corresponding shoulder in the lamp.

7. The jacketed lamp bulb envelope as recited in claim 3, wherein the structural feature comprises a raised portion on an exterior of the ceramic cup in the area of the aperture, the raised portion being adapted to be readily grasped for positioning the ceramic cup.

8. The jacketed lamp bulb envelope as recited in claim 1, wherein the ceramic cup comprises a external flange about a periphery thereof.

9. The jacketed lamp bulb envelope as recited in claim 8, wherein the flange is located proximate the open end of the ceramic cup.

10. The jacketed lamp bulb envelope as recited in claim 8, wherein the flange is located proximate the partially closed end of the ceramic cup.

11. A jacketed lamp bulb envelope, comprising:
    a ceramic cup having an open end and a closed end;
    a ceramic washer covering the open end of the ceramic cup, the washer defining an aperture therethrough;
    a lamp bulb positioned inside the ceramic cup abutting the aperture; and
    a reflective ceramic material filling an interior volume of the ceramic cup not occupied by the bulb.

12. A method of packing a jacketed lamp bulb envelope of the type comprising a ceramic cup with a lamp bulb disposed therein, the method comprising the steps of:
    filling the ceramic cup with a flowable slurry of reflective material; and
    applying centrifugal force to the cup to pack the reflective material therein.

\* \* \* \* \*

UNITED STATES PATENT AND TRADEMARK OFFICE
CERTIFICATE OF CORRECTION

PATENT NO. : 6,310,443 B1
DATED : October 30, 2001
INVENTOR(S) : Izrail Levin et al.

It is certified that error appears in the above-identified patent and that said Letters Patent is hereby corrected as shown below:

<u>Title page,</u>
Item [75], Inventors, delete the following listed inventors:
"Donald A. MacLennan, Aleksandr Gitsevich, Gary K. Bass, James T. Dolan, Kent Kipling, Douglas A. Kirkpatrick, Yongzhang Leng, Malcolm Smith, and William C. Trimble."

Signed and Sealed this

First Day of October, 2002

*Attest:*

*Attesting Officer*

JAMES E. ROGAN
*Director of the United States Patent and Trademark Office*